March 15, 1960 K. E. WALKER 2,929,026

AMPLIFIER PHASE-SHIFT CORRECTION BY FEEDBACK

Filed Aug. 30, 1955

INVENTOR.
KENNETH E. WALKER
BY
Oscar J. Hazeltine
ATTORNEY

United States Patent Office 2,929,026

Patented Mar. 15, 1960

2,929,026

AMPLIFIER PHASE-SHIFT CORRECTION BY FEEDBACK

Kenneth E. Walker, Beverly, N.J., assignor to Philco Corporation, Philadelphia, Pa., a corporation of Pennsylvania Application August 30, 1955, Serial No. 531,456

2 Claims. (Cl. 330—107)

This invention relates to improvements in amplifiers and more specifically to improvements in so-called single-ended push-pull amplifiers.

A form of amplifier is known (see article by A. Peterson and D. B. Sinclair in Proceedings of the Institute of Radio Engineers, January 1952, p. 7) which comprises first and second electronic devices such as vacuum tubes connected in series arrangement across a D.-C. plate supply such that the plate of the first tube is connected to the positive terminal of the D.-C. supply and the cathode of the second tube is connected to the negative terminal of the D.-C. supply. The cathode of the first tube ordinarily is connected to the anode of the second tube. Input signal voltages having the same waveform but oppositely phased are applied across the control grid-cathode gaps of the two series connected tubes. The two tubes function as variable resistors connected in series arrangement across the plate supply and whose magnitudes vary in response to the magnitudes of the signals applied to the control grid-cathode gaps thereof. Since said applied signals are oppositely phased, the impedances of the two tubes vary in an inverse manner with respect to each other. Thus the potentials across the two tubes also vary in an inverse relationship and the potential existing at the midpoint (which constitutes the output terminal) between the two tubes varies in accordance with the instantaneous ratio of the impedances of the tubes. Assuming the two series connected tubes to have similar operating characteristics and further assuming the two tubes to be operating 180° out of phase with each other, the even-order distortion that would be produced due to the non-linearity of a single tube is cancelled out. The load can be connected between the said midpoint and the negative terminal of the plate battery supply. This particular type load arrangement is defined as a single ended load. It is to be noted that, in this type of amplifier, no output transformed is required to supply the output signal thereof to the single ended load. This feature is important when signals having high frequencies are involved since the use of a transformer would introduce distortion into the high frequency components of such signals. Because of this feature this form of amplifier can be employed over a wide band of frequencies. Further, because the two tubes are connected in parallel with each other with respect to the single ended load, the output impedance of the amplifier is approximately one half that of the plate impedance of one of the tubes. This is about one-fourth the plate-to-plate impedance of a conventional push-pull amplifier in which the two output tubes operate effectively in series for supplying the A.-C. load. Thus this form of amplifier can be utilized to supply a signal to a relatively low impedance single ended load without employing an output transformer.

The oppositely phased signals applied across the control grid-cathode gaps of the said series connected tubes may be obtained through the use of a conventional phase inverter stage comprising a vacuum tube having equal impedances such as resistors in the plate and cathode circuits thereof. The voltage developed across the resistor in the plate circuit is applied across the control grid-cathode gap of the first of said series connected tubes. The voltage appearing across the resistor in the cathode circuit of said tube is applied across the control grid-cathode gap of the other of the series connected tubes. These two signals are oppositely phased.

It is necessary that the phase inverter stage be connected to the push-pull output stage only with respect to A.-C. signals. To block D.-C. signals, coupling capacitors may be employed to couple the plate and cathode of the tube of the phase inverter stage to the control grids of the first and second tubes of the push-pull output stage. These coupling capacitors, however, produce distortion in the amplifier output by reason of the phase shifts which they produce in the signals supplied from the phase inverter stage to the control grids of the series connected tubes. Furthermore, if a coupling condenser is provided between the output terminal of the amplifier and the load connected thereto, as may be desirable for well-known reasons, it will tend further to distort the signal supplied to the load.

While such distortion could be largely eliminated by employing larger coupling capacitors, such an expedient is expensive. I have found that the distortion can be minimized in amplifiers of this sort by the provision of a feedback path suitably connected from an appropriate point in the output of the amplifier to an appropriate point in the phase inverter stage which supplies oppositely phased signals to the input of the series connected tubes comprising the amplifier. Moreover I have found that, by appropriately connecting this feedback path and by suitable design thereof, it is possible substantially to eliminate the distortion produced by phase shifts in the coupling from the output of the amplifier to its load, as well as that produced by phase shifts in the couplings between the phase inverter stage and the series connected tubes.

Accordingly it is an object of my invention to provide an improved amplifier of the general type above described.

Another object is to provide means for minimizing distortion due to phase shifts produced by the coupling elements in such amplifiers.

Still another object of the invention is to provide such an amplifier including means for automatically controlling the balance of the signals supplied from the output of the phase inverter stage to the respective input of the series-connected push-pull tubes.

In accordance with the invention a feedback circuit is constructed and arranged to couple the midpoint of the push-pull amplifier to the plate of the tube contained in the phase inverter through the plate resistor thereof. This feedback circuit comprises a capacitor whose value is selected so as to produce across said plate and cathode resistors feedback signals whose phases are different by a predetermined amount from the phases of the said oppositely phased signals appearing across said plate resistor and said cathode resistor. The amount of these differences in phase and the magnitude of the feedback signal must be such that, when the feedback signal is combined with the said oppositely phased signals, there will be produced across said plate resistor and said cathode resistor resultant signals whose phases are shifted from the phase of said first and second oppositely phased signals by amounts which are substantially equal but opposite to the shifts in phase caused by the coupling capacitors between the phase inverter stage and the push-pull output stage.

As will be set forth later in the specification, the value of said feedback capacitive means necessary to accomplish the above objective can be defined approximately by a mathematical expression in terms of the circuit constants.

When a D.-C. blocking capacitor is employed between the said midpoint and the load, the said feedback capacitor can be connected to the junction betyeen said D.-C. blocking capacitor and said load instead of said midpoint. The said feedback capacitor can then be selected to have a value whereby the phase distortion produced by said D.-C. blocking capacitance can be compensated for as well as the phase distortion produced by said coupling capacitors.

A feature of the invention is the means employed for biasing the grid of the said first tube of the push-pull amplifier. This means comprises a voltage divider connected between the cathode circuit of said first tube and the negative terminal of the plate supply employed for the series connected tubes of said push-pull amplifier. Thus the voltage divider is in parallel with the said second tube. The control grid of the first tube is connected to a tap in said voltage divider. If the potential of the cathode of said first tube should tend to change, as for example, in a downward direction, the potential of the tap wlil decrease also, but in a lesser degree, thus decreasing the bias on the control grid. Consequently the plate resistance of the tube will be reduced and the potential of the cathode increased. The circuit is thus inherently self balancing.

The objects and features of the invention will be more fully understood from the following detailed description when read in conjunction with the drawing in which.

Figure 1:
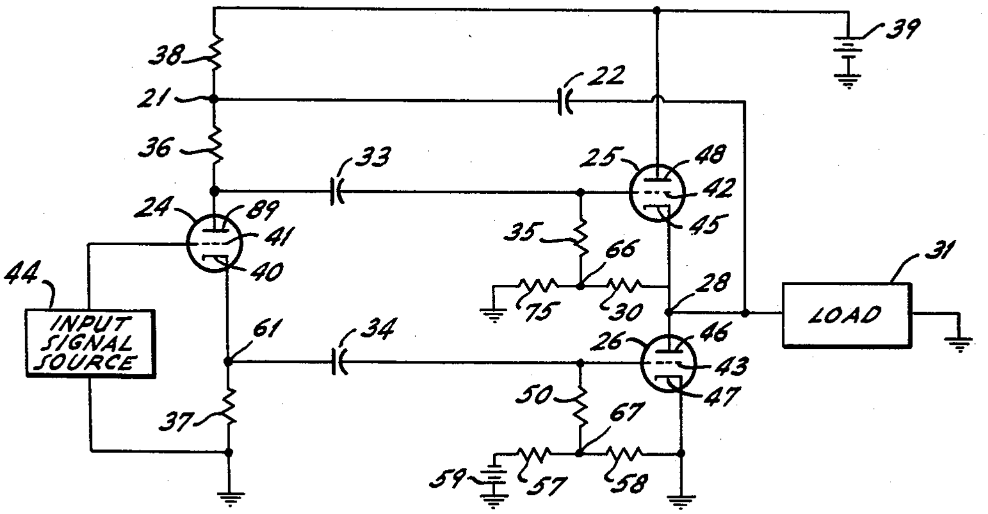
Figure 1 shows a schematic sketch of one form of the invention.

Referring now to Figure 1 there is shown an amplifier of the known form hereinbefore described incorporating a feedback circuit in accordance with the invention. As hereinbefore mentioned, the amplifier comprises a push-pull output stage together with a phase inverter stage for supplying appropriately phased input signals to the respective tubes of the push-pull stage.

The push-pull output stage consists essentially of triodes 25 and 26 connected in a series arrangement across the D.-C. plate supply 39. The two tubes 25 and 26 function as a pair of variable impedances whose respective values depend upon the potential existing across the control grid-cathode gaps thereof. In order to function effectively as a balanced push-pull amplifier, input signals having the same waveform and magnitude but being oppositely phased should be applied across the control grid-cathode gaps of the tubes 25 and 26. Thus as the impedance represented by one tube decreases the impedance represented by the other tube increases to cause a fluctuation of the potential at the point 28 between the tubes 25 and 26. Since the tubes 25 and 26 have the same characteristics, and further since the signals applied across the control grid-cathode gaps thereof are of the same waveform, but oppositely phased, the even-order distortion which would be present in a single tube is effectively cancelled out. Further, since the impedances of the tubes 25 and 26 vary inversely, the potential thereacross will also vary inversely so that the potential appearing at the point 28 represents the sum of the voltage changes appearing across the tubes 25 and 26.

The control grids 42 and 43 of the tubes 25 and 26 are biased by potential divider means. More specifically the control grid 42 of tube 25 is biased negatively with respect to the cathode 45 by means of the potential divider comprised of resistors 75 and 30. The control grid 42 is connected to the midpoint 66 of the potential divider through resistor 35 which performs the function of increasing the time constant of the capacitor 33. The use of the voltage divider provides a self balancing feature with respect to the potential of the cathode 45. More specifically, under static conditions (that is, no signal supplied to the grid 42) any tendency for the voltage at the cathode 45 to change, as, for example, in a downward direction, causes a reduction of the bias on the grid 42 since the potential of the grid 42 will not decrease as much as the potential of the cathode 45. Thus the plate resistance of the tube 25 is reduced and the potential of the cathode 45 is caused to increase. This portion of the circuit is thus inherently self balancing. The control grid 43 of the tube 26 is biased by means of a potential divider comprised of resistors 57 and 58 which connect the cathode 47 to the negative terminal of battery 59 and which have a tap 67 therebetween. The control grid 43 is connected to said tap 67 through the resistor 50 which functions to increase the time constant of the capacitor 34.

As stated before, signals of the same amplitude and waveform but oppositely phased must be supplied across the control grid-cathode gaps of the tubes 25 and 26. Such signals are derived in a well known manner by the phase inverter stage which comprises the tube 24 having equal resistors 36 and 37 in its plate 89 and cathode 40 circuit respectively. Signals having the same waveform but being oppositely phased are produced across said equal resistors 36 and 37 in response to input signals supplied to the control grid 41 of the tube 24 from the input signal source 44. The resistor 38 completes the D.-C. current path for the tube 24 from the point 21 to the positive terminal of the D.-C. plate supply 39. However the primary function of the resistor 38 is to provide an impedance across which can appear the A.-C. signals supplied to the point 21. If the point 21 were connected directly to the D.-C. plate supply 39 the output midpoint 28 would be effectively short-circuited with respect to A.-C. signals to said supply 39 through the capacitor 22.

Connections are provided from the plate and cathode of phase inverter tube 24 respectively through coupling condensers 33 and 34 to grids 42 and 43 of the push-pull tubes 25 and 26 to supply the required oppositely phased signals to the input of these tubes. As hereinbefore mentioned, these coupling condensers produce phase shifts in the signals supplied to the grids of tubes 25 and 26, which cause resultant distortion in the output signal developed at point 28.

In accordance with the invention, the distortion due to the phase shifts produced by both of these coupling condensers can be substantially reduced by means of single feedback connections from the point 28 in the output of the push-pull stage, through the condenser 22 to the plate of the phase inverter tube 24. In particular, if the value of condenser 22 is appropriately selected, such distortion can be completely eliminated.

It can be shown that the approximate value of the capacitor 22 in terms of circuit constants to accomplish the above objective is expressed by the following equation:

$$C_{22}=\frac{1}{\frac{R_b}{gR_aC_{33}}\left[\frac{R_x}{R_{33}}-2g\right]}$$

where $C_{22}$ is the value of capacitor 22, $R_b$ is the value of the equivalent resistance in series with the capacitor 22 with respect to the signal supplied thereto from the output terminal 28, $C_{33}$ is the value of the capacitor 33, $R_a$ is the value of the equivalent resistance in series with the capacitor 33 with respect to the signal supplied thereto from the phase inverter circuit, $R_{36}$ is the value of the resistor 36, $R_x$ is the value of the sum of the resistor 36, the resistor 37 and the plate resistance of the tube 24, and $g$ is the gain of the tube 25.

The values of $R_a$ and $R_b$ can be expressed in terms of known circuit constants. However such expressions would unduly complicate the above equation so only the general method of obtaining the expressions for $R_a$ and $R_b$ will be described herein. This general method makes use of Thevenin's Theorem. The terminals of the capacitor whose equivalent series resistance is being determined are regarded as the output terminals of the network to which the theorem is being applied. The equivalent resistance ($R_a$ or $R_b$) is equal to the resistance presented to the said output terminals as defined by Thevenin's Theorem. The gain of the tube 25 which is represented by the term "*g*" in the above equation can be determined from the values of the components making up the load of the tube and the characteristics of the particular tube selected.

A suitable set of circuit constants for the circuit of Figure 1 are as follows:

| | | |
|---|---|---|
| Resistor **38** | ohms | 12,000 |
| Resistor **36** | do | 2,000 |
| Resistor **37** | do | 2,000 |
| Resistor **35** | megohms | 1 |
| Resistor **75** | ohms | 820,000 |
| Resistor **30** | do | 27,000 |
| Resistor **50** | megohms | 1 |
| Resistor **57** | ohms | 820,000 |
| Resistor **58** | do | 27,000 |
| Capacitor **34** | μf | 0.1 |
| Capacitor **33** | μf | 0.1 |
| Capacitor **22** | μf | 12 |

Tube 24 may be a triode type 6AB4 and tubes 25 and 26 may be one half of a double triode type 5687.

Figure 2:
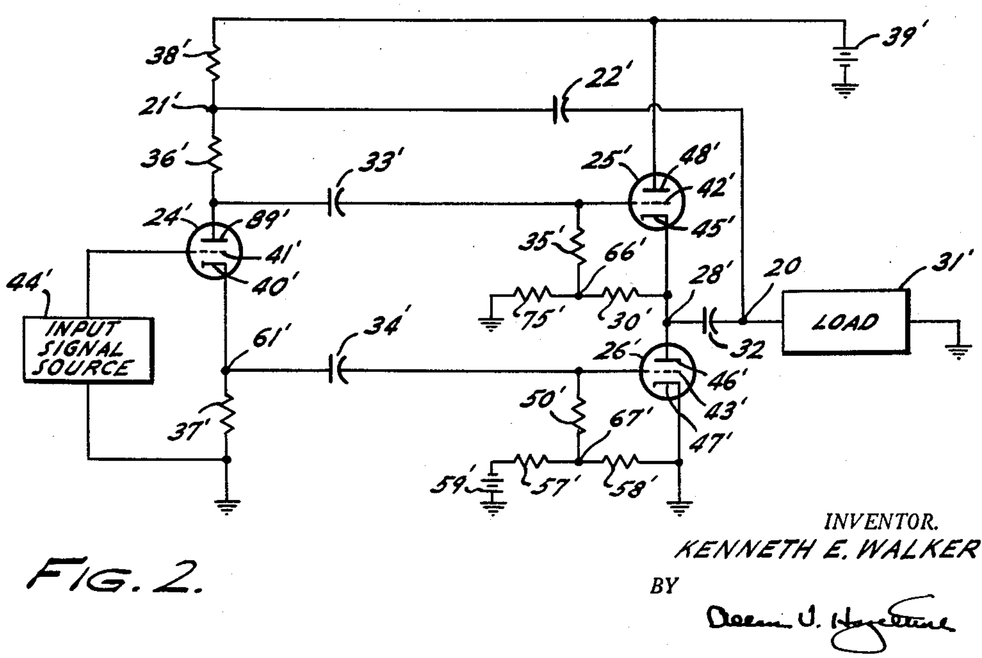
Figure 2 shows a schematic sketch of another embodiment of the invention.

Referring now to Figure 2 there is shown an embodiment of the invention that is similar to that of Figure 1 except for the following differences. A D.-C. blocking capacitor 32 has been inserted between the point 28' and the load 31'. Further the capacitor 22' is connected to the point 20 between the blocking capacitor 32 and the load 31' rather than to the midpoint 28'. All of the remaining components of the circuit of Figure 5 have corresponding components in the circuit of Figure 1 and are identified by the same reference character (primed).

The capacitor 32 introduces further distortion in the form of phase shift into the signal passed therethrough. By connecting the capacitor 22' to the point 20 and by selecting a proper value for the capacitor 22', the distortion introduced by the capacitor 32 as well as the distortion introduced by the capacitors 33' and 34' can be compensated for. The expression for the approximate value of the capacitor 22' can be shown to be as follows:

$$C'_{22}=\frac{1}{R'_b\left[\frac{R'_x}{g'C'_{33}R'_aR'_{36}}+\frac{R'_x}{g'C_{32}R_cR'_{36}}-\frac{2}{C'_{33}R'_a}-\frac{2}{C_{32}R_c}\right]}$$

where $C_{32}$ is the value of the capacitor 32, and $R_c$ is the value of the equivalent resistance in series with the capacitor 32 with respect to the signal supplied thereto from the midpoint 28' and where the primed characters correspond to similar characters (unprimed) in the mathematical expression relating to Figure 1.

As is the case with respect to $R_a$ and $R_b$ the resistance $R_c$ can be expressed in terms of known circuit constants in the above equation. However, for reasons of simplicity this is not done. Such an expression can be obtained through the use of Thevenin's Theorem as set forth hereinbefore with respect to $R_a$ and $R_b$.

It is to be noted that the forms of the invention shown and described herein are but preferred embodiments of the same and that various changes may be made in the values of circuit constants and in the circuit arrangement without departing from the scope of the invention.

I claim:

1. In a push-pull amplifier system; a phase-inverter driver stage including a single electron tube having a cathode, a control grid and an anode, a cathode resistor, an anode resistor, and another resistor connected between said anode resistor and a source of anode supply voltage; a push-pull output stage including a pair of electron tubes serially connected across the source of anode supply voltage, each of said tubes having a cathode, a control grid and an anode; means for supplying an input signal to the control grid of the driver tube; a connection including a coupling capacitor extending from the cathode of said driver tube to the control grid of one of the output tubes for supplying thereto a signal of one phase; a connection including a coupling capacitor extending from the anode of said driver tube to the control grid of the other output tube for supplying thereto a signal of opposite phase; an output connection extending from the junction of the series-connected output tubes for deriving an output signal which tends to be distorted due to phase shifts produced by both of said capacitors; and means comprising a single feedback connection for substantially preventing such distortion of the output signal, said feedback connection extending from said output connection to the junction of said anode resistor and said other resistor and including a capacitor having a capacitance value such that the feedback connection produces across said cathode resistor and said anode resistor compensating signals which introduce compensating phase shifts into the opposite phase signals derived from the cathode and anode of said driver tube.

2. In a push-pull amplifier system; a phase-inverter driver stage including a single electron tube having a cathode, a control grid and an anode, a cathode resistor, an anode resistor, and another resistor connected between said anode resistor and a source of anode supply voltage; a push-pull output stage including a pair of electron tubes serially connected across the source of anode supply voltage, each of said tubes having a cathode, a control grid and an anode; means for supplying an input signal to the control grid of the driver tube; a connection including a coupling capacitor extending from the cathode of said driver tube to the control grid of one of the output tubes for supplying thereto a signal of one phase; a connection including a coupling capacitor extending from the anode of said driver tube to the control grid of the other output tube for supplying thereto a signal of opposite phase; an output connection including a load-coupling capacitor extending from the junction of the series-connected output tubes for deriving an output signal which tends to be distorted due to phase shifts produced by all of said capacitors; and means comprising a single feedback connection for substantially preventing such distortion of the output signal, said feedback connection extending from the load side of said load-coupling capacitor to the junction of said anode resistor and said other resistor and including a capacitor having a capacitance value such that the feedback connection produces across said cathode resistor and said anode resistor compensating signals which introduce compensating phase shifts into the opposite phase signals derived from the cathode and anode of said driver tube.

References Cited in the file of this patent

UNITED STATES PATENTS

| | | |
|---|---|---|
| 2,284,855 | West | June 2, 1942 |
| 2,488,567 | Stodola | Nov. 22, 1949 |
| 2,659,775 | Coulter | Nov. 17, 1953 |
| 2,743,321 | Coulter | Apr. 24, 1956 |
| 2,761,019 | Hall | Aug. 28, 1956 |

OTHER REFERENCES

Valley et al. text, "Vacuum Tube Amplifiers," Oct. 1, 1948, pages 263–265, 354.

Pamphlet, "The General Radio Experimenter," volume 26, No. 5, October 1951, pages 5 and 7.